Nov. 30, 1926.
O. J. JOHNSON
1,608,752
CAN BODY FORMING AND SOLDERING MECHANISM
Filed May 27, 1920
3 Sheets-Sheet 2
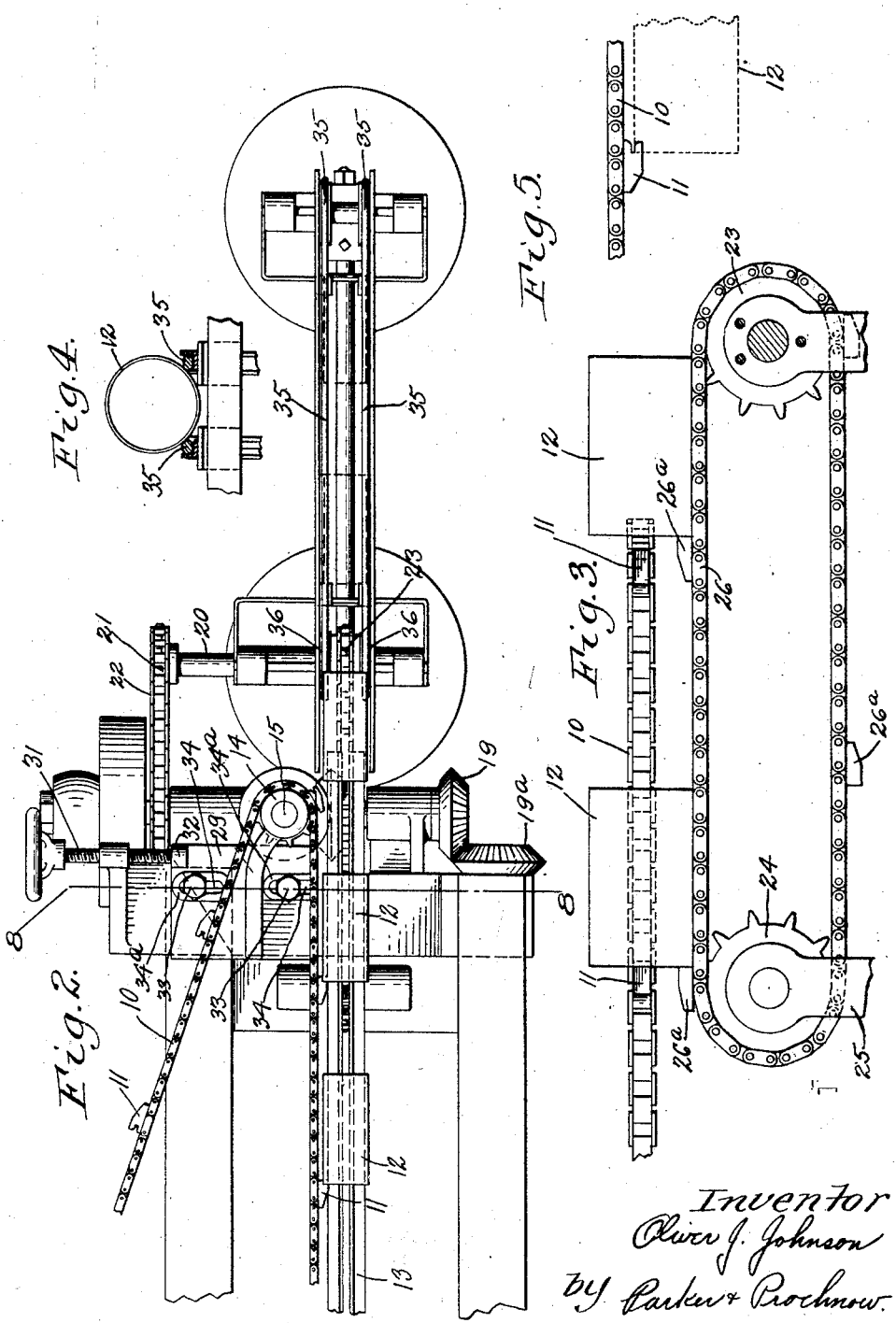

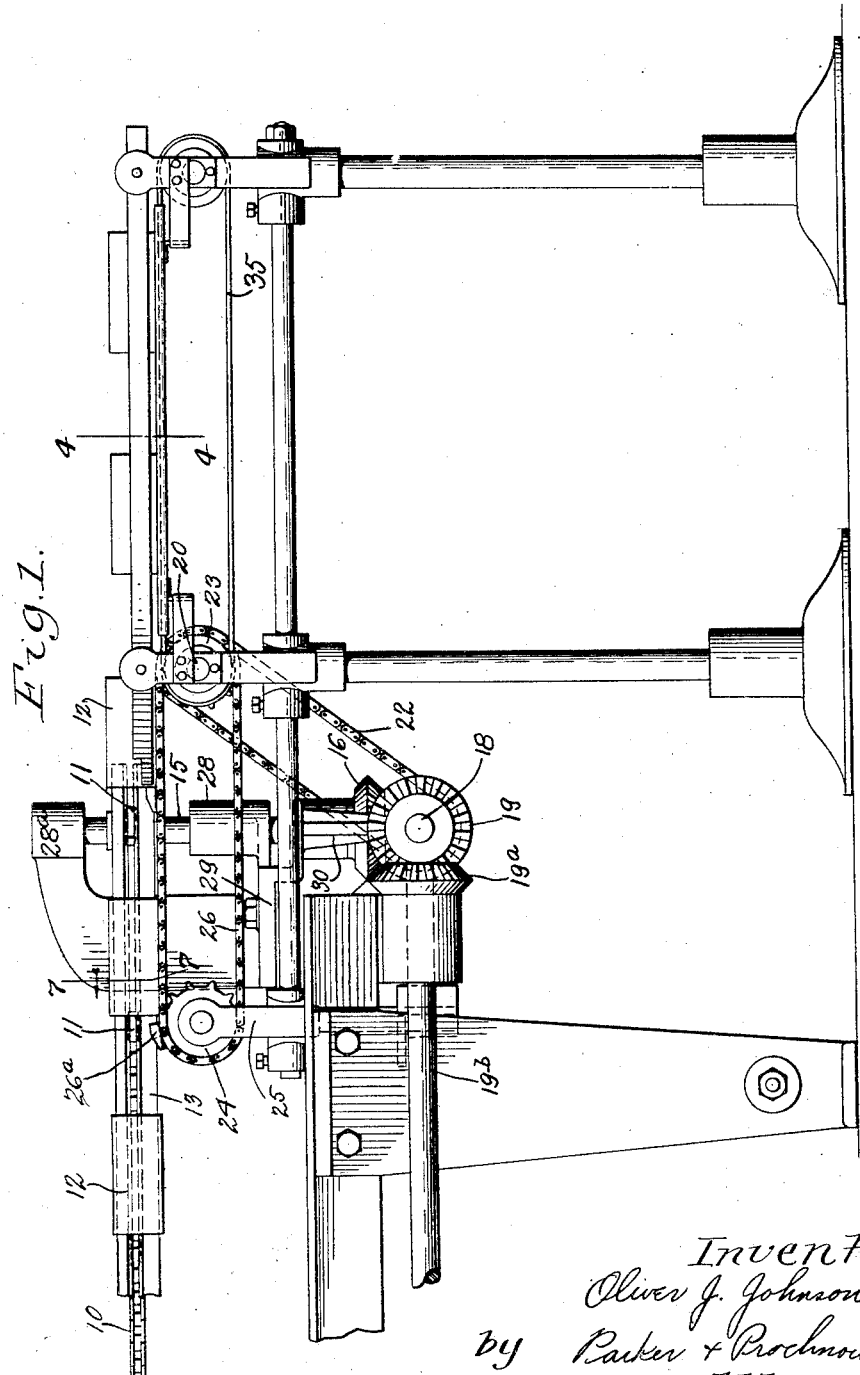

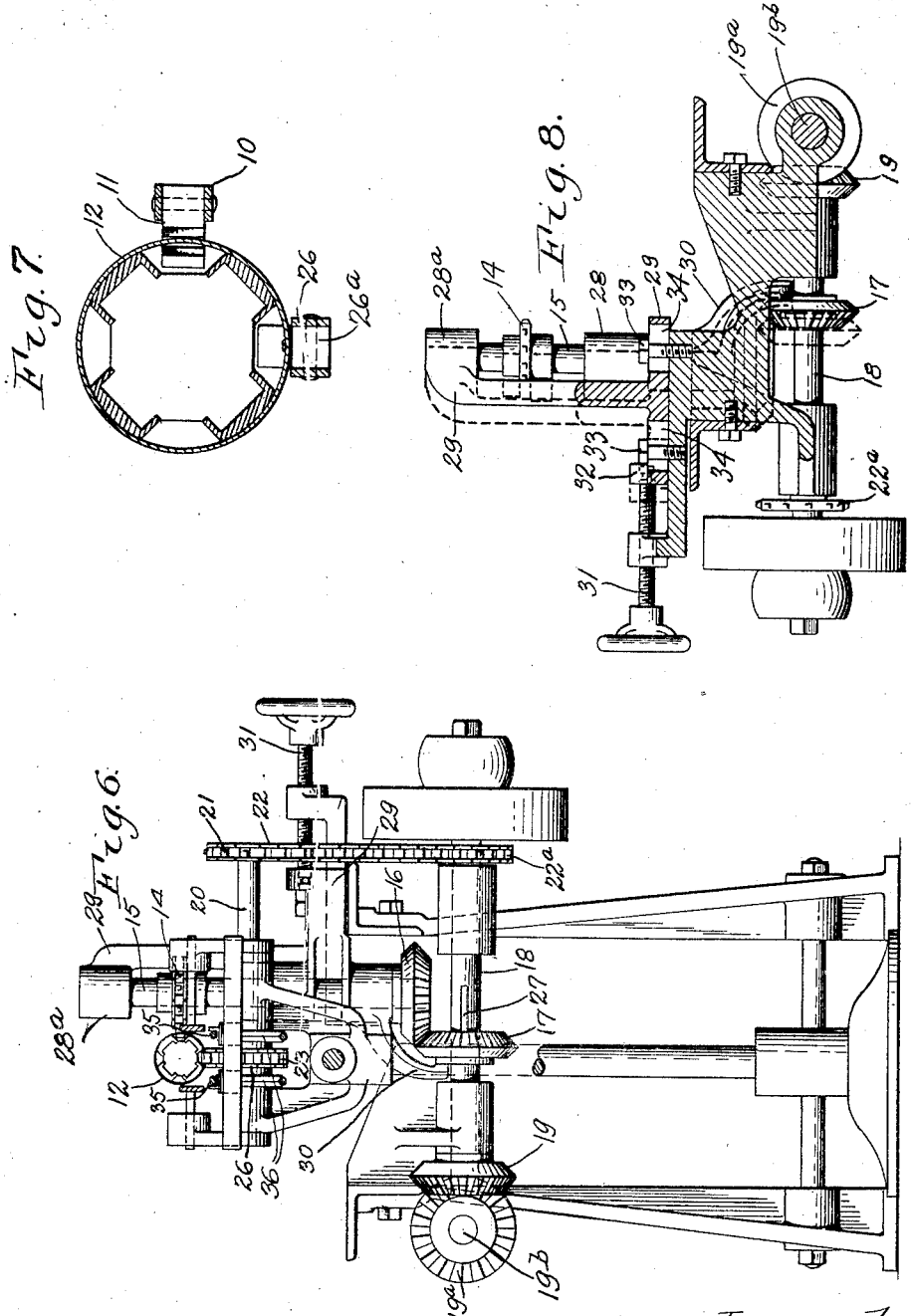

Patented Nov. 30, 1926.

1,608,752

UNITED STATES PATENT OFFICE.

OLIVER J. JOHNSON, OF WHEELING, WEST VIRGINIA.

CAN-BODY FORMING AND SOLDERING MECHANISM.

Application filed May 27, 1920. Serial No. 384,645.

This invention relates to can forming machines and particularly to ejector mechanism for stripping or disengaging the formed can bodies from the conveyor which moves them along the forming mandrel and soldering horn. This invention is adapted for use with machines having either inside or outside types of soldering horns.

In some can body forming machines, it has been proposed to carry the formed can bodies along the soldering horn by means of an endless chain conveyor equipped with suitable can-engaging lugs which grip the edges of the bodies. In the operation of such machines, difficulties have been encountered in removing or releasing the can bodies from the lugs after they have passed along the soldering horn, without denting or damaging the bodies. In that type of conveyor wherein the can bodies are gripped or held to the conveyor by reason of the engagement of the edge of the can body in a slotted or recessed lug, during the progress of the soldering and wiping operations the edge of the can body is forced tightly into the recess of the lug, with the result that when the can is disengaged from the conveyor by the known means the edge of the body is liable to bending or distortion. This causes defective cans later on when the ends are applied to the bodies. To overcome these objections I provide means operating in conjunction with conveyors of the sort hereinbefore discussed, whereby the formed body is gently released from the carrying lugs, thereby reducing the liability of damage or injury to the can bodies to a minimum.

The objects of the present invention are to provide an apparatus of the type set forth which shall consist of few parts, which shall be inexpensive to manufacture, which shall be automatic in operation and which shall operate to effectively release the can bodies from the conveyor without injurying the cans.

With the above and other objects in view, my invention consists in certain features of structure, combination and relation which will be more fully set forth hereinafter.

I have illustrated one embodiment of my invention in the accompanying drawings wherein:

Fig. 1 is a side elevation of a portion of a can body forming machine embodying the apparatus of the present invention.

Fig. 2 is a top plan view of the machine illustrated in Fig. 1.

Fig. 3 is a side elevation on an enlarged scale of a portion of the can conveyor and my improved ejector or stripper.

Fig. 4 is a vertical section taken on lines 4—4, Fig. 1.

Fig. 5 is a detail in plan of a portion of the chain conveyor showing a can body in dotted lines thereon.

Fig. 6 is an end elevation of the machine.

Fig. 7 is a transverse vertical section taken on lines 7—7, Fig. 1, but enlarged.

Fig. 8 is a section taken on lines 8—8, Fig. 2.

Referring to the drawings wherein similar numerals denote like characters throughout the several views:

For the purposes of illustration, I have shown my improved device as used in connection with a machine which includes an endless chain conveyor 10 carrying a plurality of grooved or recessed dogs 11 each dog being fixed to a single link or part of the chain and which is adapted to move the can bodies 12 forward from the former over the fluxing device, soldering device and wipers, on the horn or guide 13, the grooves or recesses in the dogs 11 providing relatively fixed jaws between which the edges of the can bodies are held and prevented from turning on the horn.

I consider it preferable to actuate the can conveyor and my improved ejector or stripper means from the same source of power, but it is within the contemplation of my invention that these parts may be operated separately if desired. In the embodiment illustrated the conveyor chain is driven through means of a sprocket wheel 14 mounted upon a vertical shaft 15. The shaft 15 is provided at its lower end with a bevel gear 16, which in turn is driven by a bevel gear 17 carried by the transverse shaft 18. This shaft may be actuated by any suitable means, such as by a bevel gear 19 in engagement with a bevel gear 19ª carried by the main power shaft 19ᵇ of the machine. A second tranverse shaft 20 is mounted above the shaft 18 and this shaft carries a sprocket 21 driven by means of a suitable chain 22 from a sprocket 22ª fixed to the shaft 18. A spocket wheel 23 is mounted on the shaft 20, this last named spocket wheel cooperating with a second sprocket 24 supported by suitable means, such as by the standard 25 on the machine, to actuate the stripper or ejector member which, in the embodiment disclosed, consists of the endless chain 26 which carries a plurality of lugs 26ª.

In the type of machine illustrated and described herein, the conveyor operates in a horizontal plane and with such a structure I have found it preferable to operate the ejector or stripper chain in a vertical plane. However, the invention is not limited to this relation of the chains, since manifestly they could be differently associated and cooperate, as hereinafter explained, to accomplish the intended purpose.

In order to provide for the most effective releasing of the can bodies, the sprocket wheels which operate the stripper bear a certain definite relation to the sprocket operating the conveyor, in that the stripper should travel at a slightly greater rate of speed than the conveyor. In order to secure this result, in the construction shown, the sprocket wheel actuating the stripper is made slightly larger and provided with a greater number of teeth than the conveyor sprocket, in actual practice a ratio of 11 to 10 having been found desirable. However, it is to be understood that this invention is not to be limited or restricted to the specific means recited as the same result may be achieved in a number of ways.

In order to accommodate the machine to cans of various sizes, a known construction is used in which conveyor chain 10, sprocket 14, shaft 15 and the pinions 16 and 17 associated therewith may be shifted laterally. To permit of this being done, the pinion 17 is slidably keyed to the shaft 18 as at 27 and the vertical shaft 15 is journaled in bearings 28, 28ª on a bracket 29 which is adjustable laterally on the frame of the machine. The bracket 29 is provided with a depending yoke 30 for shifting the bevel gear 17 and the bracket is adjusted to position through means of a hand screw 31 secured to a lug 32 on the bracket 29. Adjustment of the bracket 29 is maintained by means of set screws 33 threaded in the frame and passing through suitable slots 34 in an extension of the bracket 29 and bearing upon shouldered portions 34ª delimiting the slots.

In connection with this improved stripper or ejector, I preferably provide a delivery device which, as illustrated, comprises two endless belts 35 which are driven from suitable pulleys 36 mounted on the shaft 20. This delivery device operates to receive the can bodies from the ejector and discharge them from the machine, and serves as a cooling means for the soldered seams.

In the operation of the device the formed can bodies are carried over the fluxing device, soldering horn and wipers by means of the chain conveyor 10, the relatively fixed jaws forming the slots or recesses in the dogs 11 preventing the can bodies from turning, or twisting during their movement through the machine. As the can body is being propelled forward it reaches a position adjacent the ejector as illustrated at the left in Fig. 3 of the drawings, and one of the lugs 26ª carried by the stripper or ejector engages the edge of the can. As the stripper is moving in the same direction and at a greater rate of speed than the conveyor, as the can is moved forward the stripper lug gradually disengages the can from the slot in the conveyor lug and when the can has reached the position indicated at the right in Fig. 3, it will be out of engagement with the conveyor lug, with the result that the stripper is free to deposit it upon the delivery flight without any danger of crimping, bending or distorting the edge of the can body.

I claim as my invention:

1. In an apparatus of the type set forth, a conveyor for moving can bodies along the soldering horn of the machine, a vertically disposed shaft carrying means for actuating said conveyor, a transversely disposed shaft, a second transversely disposed shaft, means for driving said shafts, a sprocket mounted on said second transverse shaft, an endless chain taking over said sprocket, a plurality of can body-engaging lugs mounted on said endless chain, a pair of pulleys on said second named shaft, and endless delivery belts cooperating with said pulleys.

2. In an apparatus of the type set forth, a conveyor for moving can bodies along the soldering horn of the machine, a vertically disposed shaft carrying means for actuating said conveyor, a bevel gear on the lower end of said shaft, a transversely disposed power shaft, a bevel gear mounted on said power shaft in engagement with said first named bevel gear, a sprocket on said power shaft, a second transversely disposed shaft, a sprocket on said second named shaft and an endless chain operatively connecting the sprocket on the second named shaft with the sprocket on the first named shaft, a second sprocket mounted on said second named shaft, an endless chain taking over said last named sprocket, and a plurality of can body-engaging lugs mounted on said endless chain.

3. In an apparatus of the type set forth, a conveyor for moving can bodies along the soldering horn of the machine, a vertically disposed shaft carrying means for actuating said conveyor, a bevel gear on the lower end of said shaft, a transversely disposed power shaft, a bevel gear mounted on said power shaft in engagement with said first named bevel gear, a sprocket on said power shaft, a second transversely disposed shaft, a sprocket on said second named shaft and an endless chain operatively connecting the sprocket on the second named shaft with the sprocket on the first named shaft, a second sprocket mounted on said second named shaft, an endless chain taking over said last named sprocket, a plurality of can body-engaging lugs mounted on said endless chain, a pair of pulleys on said second named shaft, and endless delivery belts co-operating with said pulleys.

4. In an apparatus of the type set forth, a horn adapted to guide can bodies through the apparatus, a conveyor having a plurality of can engaging dogs for engaging and moving the cans along the horn through successive can forming operations, each dog having a slot extending rearwardly from the forward end in which the rear end of the can operated thereby is received and the can held against turning on its longitudinal axis as it travels, a stripper movable along the path of movement of said can bodies and in substantially the same direction before the cans leave the horn, and having parts engagable with the edges of said can bodies at the ends of the seams thereof to propel the cans further along the horn, and means for moving said stripper at a speed somewhat greater than the speed of travel of said conveyor, whereby said can bodies are gradually disengaged from the slots of said conveyor dogs, before the cans leave the horn and before the conveyor dogs leave their path of travel along the horn, and the pressure exerted on said bodies by said stripper is resisted by the can body seams.

5. In an apparatus of the type set forth, a horn for guiding can bodies through the apparatus, a conveyor having a stretch running substantially parallel with a portion of the horn and having dogs engaging the ends of the can to push the same along the horn, each dog having a slot extending rearwardly from its forward end in which the rear end of the can operated thereby is received and the can held against turning on its longitudinal axis during its travel along the horn with said dog, an endless belt having a stretch also extending approximately parallel with and adjacent to the portion of the horn during the final increment of travel of the cans by said conveyor, said endless belt having portions engageable with the can bodies at the ends of the seams thereof to push the cans further along the horn without buckling of the can bodies, and means for moving said endless belt at a speed somewhat greater than the movement of said conveyor, whereby the cans approaching the end of their movement with the conveyor will be engaged by said portions of the endless belt and accelerated in their movement along the horn to cause disengagement of the can bodies from the slots in said dogs prior to the point at which the cans would otherwise be released by the conveyor, whereby the cans will be fully released without injury at the end of their travel with the conveyor.

Witness my hand this 11th day of May, 1920.

OLIVER J. JOHNSON.